United States Patent
Murayama (10) Patent No.: US 10,097,012 B2
(45) Date of Patent: Oct. 9, 2018

(54) POWER SUPPLYING DEVICE AND WIRELESS POWER-SUPPLYING SYSTEM

(71) Applicant: IHI CORPORATION, Tokyo (JP)

(72) Inventor: Takahiko Murayama, Tokyo (JP)

(73) Assignee: IHI CORPORATION, Tokyo (JP)

( * ) Notice: Subject to any disclaimer, the term of this patent is extended or adjusted under 35 U.S.C. 154(b) by 190 days.

(21) Appl. No.: 14/982,207

(22) Filed: Dec. 29, 2015

(65) Prior Publication Data
US 2016/0134131 A1     May 12, 2016

Related U.S. Application Data (63) Continuation of application No. PCT/JP2014/056780, filed on Mar. 13, 2014.

(30) Foreign Application Priority Data

Jul. 19, 2013 (JP) .................................. 2013-150951

(51) Int. Cl.
*H02J 50/80* (2016.01)
*H02J 17/00* (2006.01)
*H02J 50/12* (2016.01)
(Continued)

(52) U.S. Cl.
CPC ............. *H02J 5/005* (2013.01); *B60L 11/182* (2013.01); *B60L 11/1812* (2013.01);
(Continued)

(58) Field of Classification Search
CPC ........ B60L 11/00; B60L 11/182; H01F 38/00; H01F 38/14; H02J 17/00; H02J 5/00;
(Continued)

(56) References Cited

U.S. PATENT DOCUMENTS 8,575,883 B2    11/2013   Sone
2008/0079392 A1*   4/2008   Baarman .................. H02J 7/025
                                                                                 320/108
(Continued)

FOREIGN PATENT DOCUMENTS

JP      10-174206 A     6/1998
JP   2000-350442 A   12/2000
(Continued)

OTHER PUBLICATIONS

International Search Report, PCT/JP2014/056780, dated Apr. 15, 2014, 2 pgs.

*Primary Examiner* — Lincoln Donovan
*Assistant Examiner* — David Mattison
(74) *Attorney, Agent, or Firm* — Volpe and Koenig, P.C.

(57) ABSTRACT

A power-supplying device for wirelessly transmitting alternating current (AC) power to a power-receiving device includes a voltage converter, an inverter circuit connected to the voltage converter, a communication unit configured to receive an output value of a rectification circuit provided in the power-receiving device from the power-receiving device, and a switching control unit configured to control the inverter circuit so that the inverter circuit converts direct current (DC) power into AC power and control whether the voltage converter steps up an input voltage or not based on whether an output value of the voltage converter or the output value of the rectification circuit reaches a specific value.

10 Claims, 5 Drawing Sheets

(51) Int. Cl.
  *H02J 5/00* (2016.01)
  *H02J 7/02* (2016.01)
  *B60L 11/18* (2006.01)
  *H02M 7/48* (2007.01)
(52) U.S. Cl.
  CPC .............. *H02J 7/025* (2013.01); *H02J 17/00* (2013.01); *H02J 50/12* (2016.02); *H02J 50/80* (2016.02); *B60L 2210/30* (2013.01); *B60L 2210/40* (2013.01); *H02M 7/48* (2013.01); *Y02T 10/7005* (2013.01); *Y02T 10/7072* (2013.01); *Y02T 10/7241* (2013.01); *Y02T 90/122* (2013.01); *Y02T 90/127* (2013.01); *Y02T 90/14* (2013.01); *Y02T 90/16* (2013.01)
(58) Field of Classification Search
  CPC .. H02J 5/005; H02J 50/00; H02J 50/12; H02J 7/00; H02J 7/025; H02M 7/00; H02M 7/48
  USPC ....................................................... 307/104
  See application file for complete search history.

(56) References Cited

U.S. PATENT DOCUMENTS

| | | |
|---|---|---|
| 2012/0068548 A1 | 3/2012 | Endo et al. |
| 2012/0187887 A1 | 7/2012 | Sone |
| 2013/0082536 A1* | 4/2013 | Taylor .................... H02J 7/025 |
| | | 307/104 |

FOREIGN PATENT DOCUMENTS

| | | |
|---|---|---|
| JP | 2006-074848 A | 3/2006 |
| JP | 2008-104319 A | 5/2008 |
| JP | 2009-101884 A | 5/2009 |
| JP | 4868077 B | 11/2011 |
| JP | 2012-152041 A | 8/2012 |
| JP | 2012-152079 A | 8/2012 |
| WO | 2012/035745 A1 | 3/2012 |
| WO | 2012/098867 A1 | 7/2012 |
| WO | 2013/046391 A1 | 4/2013 |

* cited by examiner

FIG. 4 ns POWER SUPPLYING DEVICE AND
WIRELESS POWER-SUPPLYING SYSTEM

The present disclosure relates to a wireless power-supplying system. This application is a continuation application based on a PCT Patent Application No. PCT/JP2014/056780, filed Mar. 13, 2014, whose priority is claimed on Japanese Patent Application No. 2013-150951, filed Jul. 19, 2013. The contents of both the PCT Application and the Japanese Application are incorporated herein by reference.

TECHNICAL FIELD

Background Art

The following Patent Document 1 discloses a power-supplying system capable of wirelessly supplying electric power from a power-supplying device to an electric vehicle at high efficiency. In this power-supplying system, the power-supplying device includes an alternating current (AC) power source, a high-frequency power driver configured to convert electric power from the AC power source into high-frequency power, a primary coil configured to supply electric power through electromagnetic induction based on the high-frequency power supplied from the high-frequency power driver, and a primary self-resonance coil configured to supply electric power to an electric vehicle through an electromagnetic field based on the electric power supplied from the primary coil. The electric vehicle includes a secondary self-resonance coil configured to receive the electric power from the primary self-resonance coil of the power-supplying device through the electromagnetic field, a rectifier configured to rectify the electric power received by the secondary self-resonance coil, a DC (direct current)/DC converter configured to convert a voltage of the electric power rectified by the rectifier, and an electronic control unit (ECU) of the vehicle configured to make a voltage between the rectifier and the DC/DC converter a target voltage by controlling the DC/DC converter. In addition, Patent Document 2 discloses a process of performing switching between a full-bridge mode for controlling ON/OFF of all of a plurality of switching elements and a single-ended mode for controlling ON/OFF of some switches according to load impedance viewed from an inverter circuit when electric power is supplied to the power-receiving device. Further, as disclosed in Patent Document 3, an AC output voltage of a half-bridge inverter decreases to half the AC output voltage of a full-bridge inverter, but the output voltage of a low-voltage rectifier is twice the output voltage of a full-wave rectifier and a voltage ratio between an inverter input voltage and a secondary-side DC voltage does not change as a whole. Thereby, because the voltage of the wireless power-supplying transformer decreases to half, there is an advantage in terms of insulation and ferrite loss reduction. As disclosed in Patent Document 4, signals related to a voltage and a current in a secondary side are transmitted to a primary side using a wireless electromagnetic coupling coil for a primary-side unit, and the primary-side unit causes a driving frequency of a primary-side inverter to change after receiving a signal transmitted from the secondary side. Thereby, stabilization control can be performed at high efficiency, in a small size, and at a low cost.

DOCUMENT OF RELATED ART

Patent Documents

[Patent Document 1]
 Japanese Unexamined Patent Application, First Publication No. 2010-530652
[Patent Document 2]
 WO 2012/098867
[Patent Document 3]
 Japanese Unexamined Patent Application, First Publication No. 2012-152041
[Patent Document 4]
 Japanese Unexamined Patent Application, First Publication No. 2006-074848

SUMMARY

Technical Problem

In the above-described conventional technology, a high-frequency power driver of the power-supplying device includes a rectification circuit, a voltage step-up chopper circuit, an inverter circuit, etc., and electric power to be supplied is adjusted by generally operating both the voltage step-up chopper circuit and the inverter circuit when the electric power is supplied. However, when both the voltage step-up chopper circuit and the inverter circuit are operated, the supply of the electric power can be implemented in only a power range in which both the voltage step-up chopper circuit and the inverter circuit are operated. Thus, for example, when it is necessary to adjust the electric power to be supplied, it is difficult to implement the supply of electric power in a wide power range from high power to low power.

The present disclosure is conceived in view of the above-described circumstances and an objective of the present disclosure is to implement the supply of electric power in a wide power range.

Solution to Problem

According to the first aspect of the present disclosure, there is provided a power-supplying device for wirelessly transmitting AC power to a power-receiving device, the power-supplying device including: a voltage converter; an inverter circuit connected to the voltage converter; a communication unit configured to receive from the power-receiving device an output value of a rectification circuit provided in the power-receiving device; and a switching control unit configured to control the inverter circuit so that the inverter circuit converts DC power into AC power and control whether the voltage converter steps up an input voltage or not based on whether an output value of the voltage converter or the output value of the rectification circuit reaches a specific value.

According to the second aspect of the present disclosure, in the power-supplying device of the above-described first aspect, the switching control unit controls the voltage converter so that the voltage converter does not step up the input voltage when the output value of the voltage converter or the output value of the rectification circuit reaches the specific value.

According to the third aspect of the present disclosure, in the power-supplying device of the above-described first aspect, the switching control unit controls the voltage converter so that the voltage converter steps up the input voltage when the output value of the voltage converter or the output value of the rectification circuit does not reach the specific value.

According to the fourth aspect of the present disclosure, in the power-supplying device of the above-described first aspect, the switching control unit outputs switching signals for switching an ON state and an OFF state of each of switching elements included in the inverter circuit and adjusts a phase difference of each of the switching signals.

According to the fifth aspect of the present disclosure, in the power-supplying device of the above-described first aspect, the switching control unit outputs switching signals for switching an ON state and an OFF state of each of switching elements included in the inverter circuit and adjusts a duty ratio of each of the switching signals.

According to the sixth aspect of the present disclosure, in the power-supplying device of the above-described first aspect, the switching control unit outputs switching signals for switching an ON state and an OFF state of each of switching elements included in the inverter circuit and adjusts a frequency of each of the switching signals.

According to the seventh aspect of the present disclosure, in the power-supplying device of the above-described first aspect, the output value of the voltage converter is a value of power, a voltage, or a current output by the voltage converter, and the output value of the rectification circuit is a value of power, a voltage, or a current output by the rectification circuit.

According to the eighth aspect of the present disclosure, there is provided a wireless power-supplying system including: a power-supplying device configured to wirelessly transmit AC power to a power-receiving device, the power-supplying device including a voltage converter, an inverter circuit connected to the voltage converter, and the first communication unit; and a power-receiving device including a rectification circuit, a control unit configured to output an output value of the rectification circuit, and a second communication unit connected to the control unit and configured to transmit the output value to the first communication unit. In the wireless power-supplying system, the power-supplying device includes a switching control unit configured to control the inverter circuit so that the inverter circuit converts DC power into AC power and control whether the voltage converter steps up an input voltage or not based on whether an output value of the voltage converter or the output value of the rectification circuit reaches a specific value.

According to the ninth aspect of the present disclosure, in the wireless power-supplying system of the above-described eighth aspect, the switching control unit controls the voltage converter so that the voltage converter does not step up the input voltage when the output value of the voltage converter or the output value of the rectification circuit reaches the specific value.

According to the tenth aspect of the present disclosure, in the wireless power-supplying system of the above-described eighth aspect, the switching control unit controls the voltage converter so that the voltage converter steps up the input voltage when the output value of the voltage converter or the output value of the rectification circuit does not reach the specific value.

According to the eleventh aspect of the present disclosure, in the wireless power-supplying system of the above-described eighth aspect, the switching control unit outputs switching signals for switching an ON state and an OFF state of each of switching elements included in the inverter circuit and adjusts a phase difference of each of the switching signals.

According to the twelfth aspect of the present disclosure, in the wireless power-supplying system of the above-described eighth aspect, the switching control unit outputs switching signals for switching an ON state and an OFF state of each of switching elements included in the inverter circuit and adjusts a duty ratio of each of the switching signals.

According to the thirteenth aspect of the present disclosure, in the wireless power-supplying system of the above-described eighth aspect, the switching control unit outputs switching signals for switching an ON state and an OFF state of each of switching elements included in the inverter circuit and adjusts a frequency of each of the switching signals.

According to the fourteenth aspect of the present disclosure, in the wireless power-supplying system of the above-described eighth aspect, the output value of the voltage converter is a value of power, a voltage, or a current output by the voltage converter, and the output value of the rectification circuit is a value of power, a voltage, or a current output by the rectification circuit.

Effects

According to the present disclosure, a switching control unit controls an inverter circuit so that the inverter circuit converts DC power into AC power and controls whether a voltage converter steps up an input voltage or not based on whether an output value of the voltage converter or an output value of a rectification circuit reaches a specific value. Because this control allows switching electric power supplied by only the inverter circuit and electric power supplied by both the inverter circuit and the voltage converter, it is possible to implement the supply of electric power in a wider power range than in the conventional technology.

DESCRIPTION OF EMBODIMENTS

First Embodiment

Hereinafter, the first embodiment of the present disclosure will be described with reference to the drawings. An outline and configuration of a wireless power-supplying system according to this embodiment is disclosed in FIG. 1. In addition, some details of a power-supplying device S are disclosed in FIG. 2A.

Figure 1:
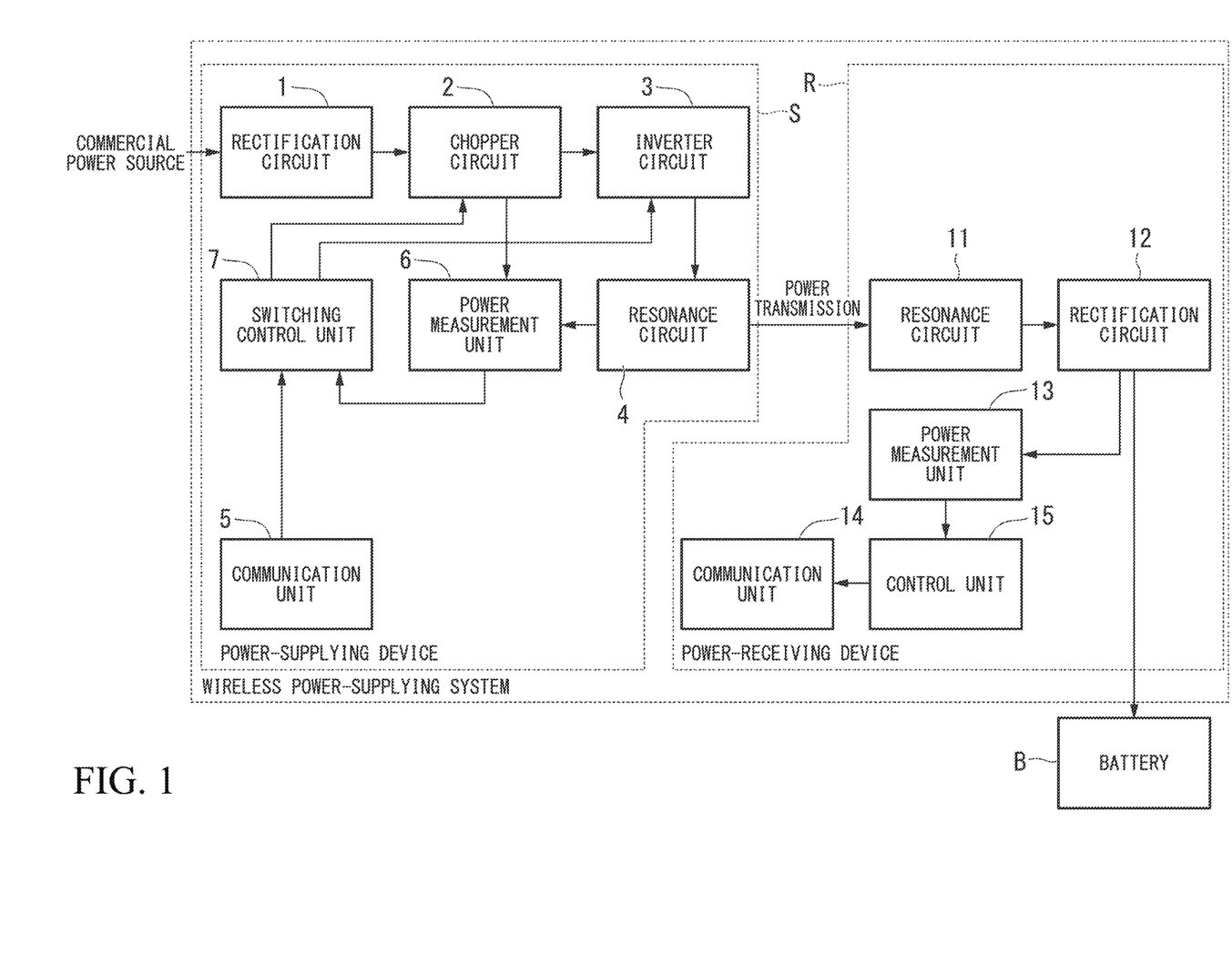
FIG. 1 is a block diagram showing a functional configuration of a wireless power-supplying system according to first to third embodiments of the present disclosure.

The wireless power-supplying system 1 according to this embodiment includes the power-supplying device S and a power-receiving device R as shown in FIG. 1. In addition, the power-supplying device S includes a rectification circuit 1, a chopper circuit 2 (voltage converter), an inverter circuit 3, a resonance circuit 4 (first resonance circuit), a communication unit 5 (first communication unit), a power measurement unit 6 (first power measurement unit), and a switching control unit 7. The power-receiving device R includes a resonance circuit (second resonance circuit) 11, a rectification circuit 12, a power measurement unit (second power measurement unit) 13, a communication unit (second communication unit) 14, and a control unit 15. The switching control unit 7 is a control means in this embodiment.

The power-supplying device S is disposed in a power-supplying facility provided on the ground in a fixed state, wirelessly supplies AC power to a movable body, and supplies DC current to a battery B (load). The power-supplying facility includes a stop space of one or more movable bodies and power-supplying devices S equal in number to the stop spaces are provided. The power-receiving device R is provided in the movable body, and converts the AC power supplied from the power-supplying device S into DC power to store the DC power. The movable body, for example, is a vehicle such as an electric vehicle or a hybrid vehicle that needs to receive electric power from the outside.

The rectification circuit 1 in the power-supplying device S, for example, is a diode bridge, and performs full-wave rectification on commercial power (for example, single-phase 100 V and 50 Hz) supplied from an external commercial power source to output the full-wave rectified power to the chopper circuit 2. The electric power (full-wave rectified power) supplied from the rectification circuit 1 to the chopper circuit 2 is a pulsating current of single polarity (for example, positive polarity) in which sinusoidal commercial power is turned up at a zero-crossing point.

Figure 2A:
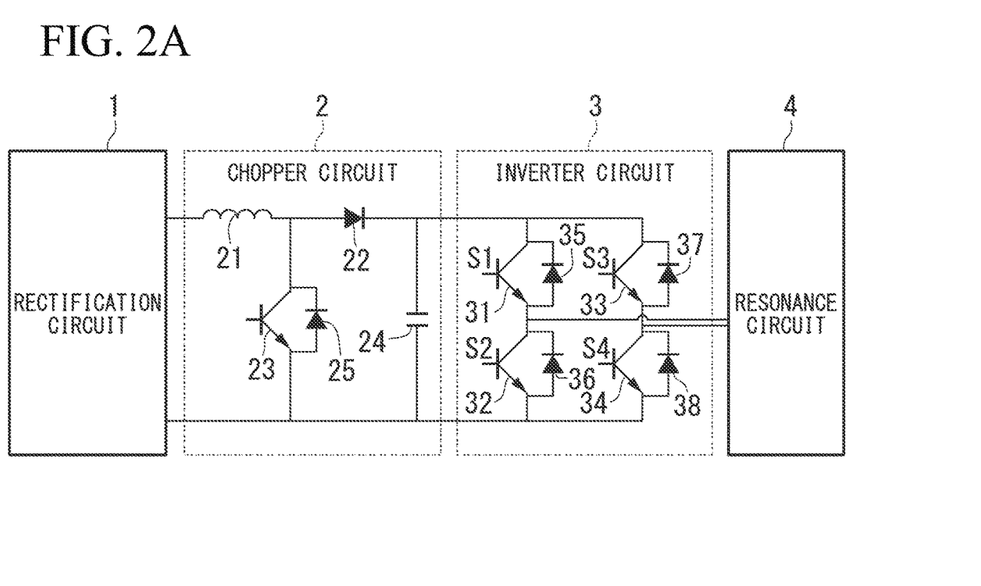
FIG. 2A is a diagram showing a configuration of an inverter circuit of a power-supplying device of the wireless power-supplying system according to the first to third embodiments of the present disclosure.

A switching operation is controlled by the switching control unit 7, so that the chopper circuit 2 adjusts its own output voltage to output the adjusted voltage to the inverter circuit 3. Specifically, the chopper circuit 2, for example, is the voltage step-up circuit 2 as shown in FIG. 2A. The chopper circuit 2 may be the voltage step-up/down chopper circuit, but will be described as an example of the voltage step-up chopper circuit here. The chopper circuit 2 includes a coil 21, a transistor 23 (switching element) connected to the coil 21 and configured to perform ON and OFF operations based on a control signal (switching signal) from the switching control unit 7, a diode 22 connected to the coil 21, and a capacitor 24 connected to the diode 22. The switching control unit 7 outputs the switching signal to the transistor 23 (switching element) included in the chopper circuit 2. The switching element iterates ON and OFF according to the switching signal from the switching control unit 7. As a result, an electromotive force occurs in the coil 21 and an input voltage for the chopper circuit 2 is stepped up (increased). In addition, the voltage stepped up by the coil 21 is smoothed by the capacitor 24 and the smoothed voltage is output as a DC voltage to the subsequent-stage inverter circuit 3. Briefly, this chopper circuit 2 is a voltage step-up chopper circuit, and steps up a voltage input from the rectification circuit 1 to output the stepped-up voltage. The electric power output from the chopper circuit 2 is DC power obtained by sufficiently smoothing full-wave rectified power which is a pulsating current according to a function of the coil 21 serving as an inductor and a function of the capacitor 24 serving as a smoothing capacitor within the chopper circuit 2.

In addition, the switching operation is controlled by the switching control unit 7 and therefore the chopper circuit 2 also functions as a power factor correction (PFC) circuit. That is, the chopper circuit 2 expands a conduction period of a current of the full-wave rectified power to improve a power factor by switching the full-wave rectified power based on the zero-crossing point of the full-wave rectified power at a frequency which is sufficiently higher than that of the full-wave rectified power. Detailed description of a power factor correction principle of the chopper circuit 2 will be omitted here because it is generally well known that the chopper circuit functions as the power factor correction circuit.

The switching operation is controlled by the switching control unit 7, and therefore the inverter circuit 3 converts DC power supplied from the chopper circuit 2 into AC power of a specific frequency (transmission frequency) to output the AC power to the resonance circuit 4. For example, the inverter circuit 3 may be a circuit as in a specific example disclosed in FIG. 2A. In order to describe the principle of the inverter circuit 3 in an easy-to-understand manner, description will be given using the circuit disclosed in FIG. 2A. The inverter circuit 3 includes transistors 31 and 32 connected in series and transistors 33 and 34 connected in series. The transistors 31 and 32 form one leg (first leg) and the transistors 33 and 34 form another leg (second leg). The transistor 31 receives a switching signal S1 input from the switching control unit 7. The transistor 32 receives a switching signal S2 input from the switching control unit 7. The transistor 33 receives a switching signal S3 input from the switching control unit 7. The transistor 34 receives a switching signal S4 input from the switching control unit 7. Diodes 35 to 38 are feedback diodes. When the inverter is an inductive load and all metal-oxide-semiconductor field-effect transistors (MOSFETs) are turned OFF, a return current from a load flows through diodes 35 to 38. In addition, the transistor can be a bipolar transistor, an electric field effect transistor, or the like which can constitute an inverter circuit.

Each of the switching signals S1 to S4 is a rectangular wave signal (pulse width modulation (PWM) signal) in which a voltage value indicating a high level and a voltage value indicating a low level are iterated. The transistors 31 to 34 perform switching between the ON state and the OFF state based on the switching signals S1 to S4, respectively. For example, each of the transistors 31 to 34 is in the ON state to flow the current when each of the switching signals S1 to S4 is at the high level, and each of the transistors 31 to 34 is in the OFF state to have high resistance and prevent the current from flowing when each of the switching signals S1 to S4 is at the low level. The relationship between the high level or the low level indicated by the switching signals S1 to S4 and ON or OFF of the transistors 31 to 34 varies with a type (n type, p type, or the like) of transistor as is well known.

Figure 2B:
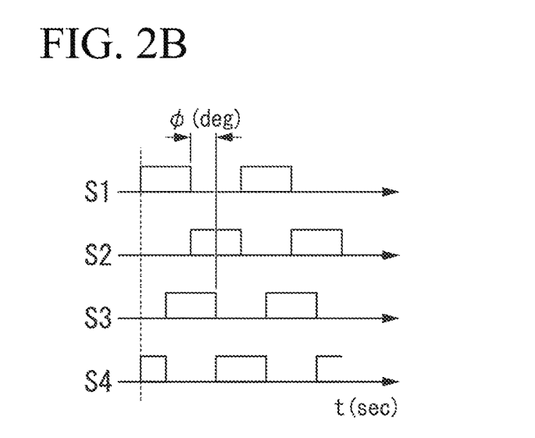
FIG. 2B is a diagram showing switching timings of the inverter circuit of the power-supplying device of the wireless power-supplying system according to the first embodiment of the present disclosure.
Figure 2C:
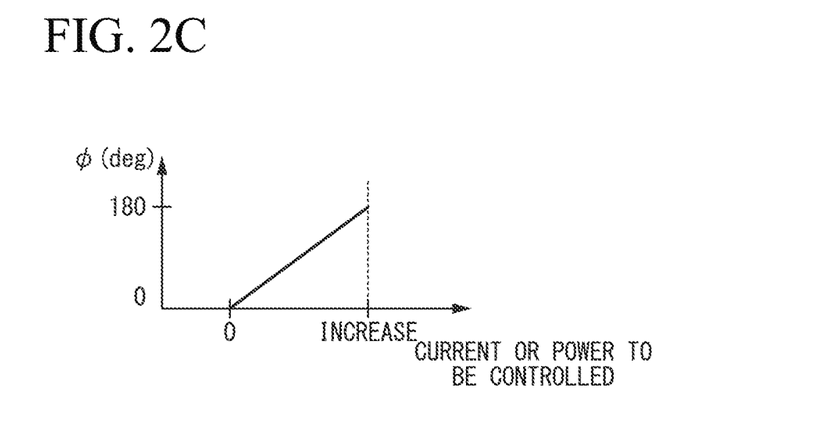
FIG. 2C is a diagram showing a voltage change according to a phase difference of a switching signal of the inverter circuit of the power-supplying device of the wireless power-supplying system according to the first embodiment of the present disclosure.
Figure 2D:
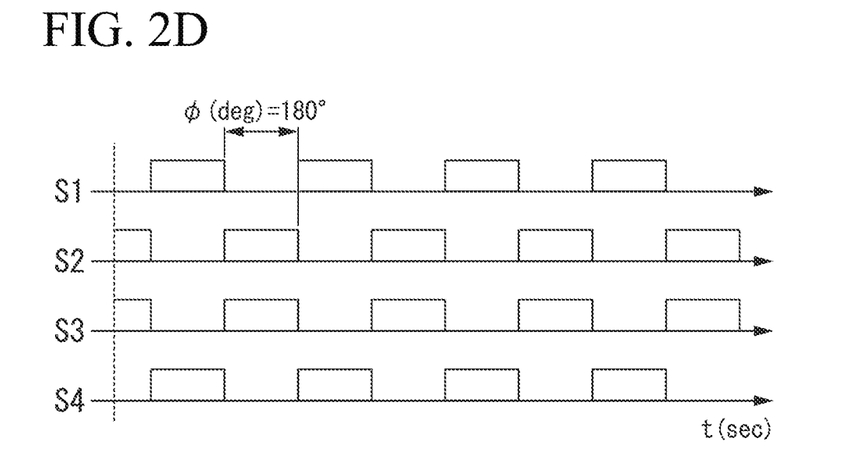
FIG. 2D is a diagram showing switching timings of an inverter circuit of the power-supplying device of the wireless power-supplying system according to the second embodiment of the present disclosure.

FIG. 2D is a specific example of waveforms of the switching signals S1 to S4 output by the switching control unit 7 to the transistors 31 to 34, respectively. Because a phase difference $\phi$ between the switching signals S1 and S3 is 180 degrees in this specific example, the switching signals S1 and S4 are in phase and the switching signals S2 and S3 are in phase. Also, in order to prevent a state in which a through current flows through the transistors 31 and 32, a phase difference $\phi$ between the switching signals S1 and S2 is 180 degrees. In addition, in order to prevent a state in which a through current flows through the transistors 33 and 34, a phase difference ϕ between the switching signals S3 and S4 is 180 degrees. A DC voltage smoothed by the capacitor 24 of the chopper circuit 2 is input to the inverter circuit 3 and currents according to waveforms of the switching signals S1 to S4 flow. In an example shown in FIG. 2D, for example, the current flows from the transistor 31 to the transistor 34 via the inside of the resonance circuit 4 in a period in which the switching signal S1 and the switching signal S4 have the high level, and the current flows from the transistor 33 to the transistor 32 via the inside of the resonance circuit 4 in a period in which the switching signal S2 and the switching signal S3 have the high level. Because a current direction is different between the period in which the switching signal S1 and the switching signal S4 have the high level and the period in which the switching signal S2 and the switching signal S3 have the high level, a DC voltage input from the chopper circuit 2 is converted into an AC voltage.

This inverter circuit 3 is connected to the resonance circuit 4 to be described below. For example, the inverter circuit 3 is connected to a power-supplying coil included in the resonance circuit 4.

As shown in FIG. 2B, the switching elements 31 and 32 are alternately turned ON/OFF and the switching elements 33 and 34 are alternately turned ON/OFF, so that the inverter circuit 3 converts the DC power into the AC power. That is, each of the leg of the switching elements 31 and 32 and the leg of the switching elements 33 and 34 is operated by a pair of switching elements.

In the resonance circuit 4, the power-supplying coil and the power-supplying capacitor are connected. Between the power-supplying coil and the power-supplying capacitor, the power-supplying coil is provided at a position opposite a specific position (a position at which the power-receiving coil is provided) of the movable body stopped in a stop space. In addition, a resonance frequency of the resonance circuit 4 is set to a frequency close to that of a basic wave of AC output from the above-described inverter circuit 3.

The communication unit 5 is provided in the power-supplying device S and performs near-field wireless communication with the communication unit 14 of the power-receiving device R. Thereby, state information indicating a state of the power-receiving device R is acquired from the communication unit 14. For example, this state information is information indicating an output value (output power, current, or voltage) of the rectification circuit 12.

This communication unit 5 outputs the state information acquired from the communication unit 14 to the switching control unit 7. Also, a communication scheme between the communication unit 5 and the communication unit 14 is near-field wireless communication such as ZigBee (registered trademark) or Bluetooth (registered trademark) or near-field optical communication using an optical signal.

The power measurement unit 6 is a sensor for detecting an output value (output power, an output current, or an output voltage) of the chopper circuit 2, and outputs a detected signal to the switching control unit 7.

The switching control unit 7 controls the chopper circuit 2 and the inverter circuit 3 based on the output power, the output current, or the output voltage of the chopper circuit 2 or the rectification circuit 12 of the power-receiving device R to be described below. For example, the switching control unit 7 operates only the inverter circuit 3, of the chopper circuit 2 and the inverter circuit 3, so that the output value (the output power, the output current, or the output voltage) of the chopper circuit 2 or the rectification circuit 12 reaches a specific value based on the detected signal input from the power measurement unit 6 or the state information of the power-receiving device R input from the communication unit 5. When the output power, the output current, or the output voltage of the chopper circuit 2 or the rectification circuit 12 has not reached the specific value according to the operation of only the inverter circuit 3, the chopper circuit 2 is also operated along with the inverter circuit 3. A mechanism in which the switching control unit 7 controls the inverter circuit 3 will be described below. In addition, when only the inverter circuit 3 is operated, this indicates that an input voltage is not stepped up by the chopper circuit 2, and specifically indicates that the switching control unit 7 does not perform switching of ON and OFF states of the transistor 23 included in the chopper circuit 2. Therefore, in this case, the switching control unit 7 supplies a switching signal whose value is constant to the transistor 23.

The resonance circuit 11 in the power-receiving device R is connected to the power-receiving coil and the power-receiving capacitor. This power-receiving coil is provided in the bottom, side, or top portion or the like of the movable body to face the power-supplying coil of the power-supplying device S in proximity when the movable body stops in the stop space.

In this resonance circuit 11, the power-receiving coil is in proximity to or faces the power-supplying coil of the resonance circuit 4, so that the power-receiving coil and the power-supplying coil are magnetically coupled. As a result, the resonance circuit 11 wirelessly receives, from the resonance circuit 4, AC power supplied to the power-supplying coil by the inverter circuit 3 according to a coupling coefficient of the power-supplying coil and the power-receiving coil and outputs the received AC power to the rectification circuit 12. That is, this wireless power-supplying system is a wireless power-supplying system based on a magnetic-field resonance scheme.

The rectification circuit 12, for example, includes a diode bridge, a reactor, and a smoothing capacitor and performs full-wave rectification and smoothing on the AC power (received electric power) supplied from the resonance circuit 11 to output the rectified and smoothed power to the battery B. The power supplied from the rectification circuit 12 to the battery B is DC power obtained when the full-wave rectified power by the diode bridge is smoothed by the reactor and the smoothing capacitor.

The power measurement unit 13 is a sensor for detecting the output power, the output current, or the output voltage of the above-described rectification circuit 12 and outputs a detected signal to the control unit 15.

The communication unit 14 transmits state information indicating the state of the power-receiving device R to the communication unit 5 by performing wireless communication with the communication unit 5 of the power-supplying device S in a near field. For example, this state information is information indicating the output power, the output current, or the output voltage of the rectification circuit 12. Similar to the communication unit 5, this communication unit 14 performs near-field wireless communication such as ZigBee (registered trademark) or Bluetooth (registered trademark) or near-field optical communication using an optical signal.

The control unit 15 performs the overall control for the power-receiving device R. Although details will be described below, the control unit 15, for example, outputs the output power, the output current, or the output voltage of the rectification circuit 12 as state information of the power-receiving device R to the communication unit 14 based on the detected signal input from the power measurement unit 13. Therefore, the communication unit 14 transmits the state information to the communication unit 5 provided in the power-supplying device as described above.

The battery B is the secondary battery such as a lithium ion battery and is charged with DC power supplied from the rectification circuit 12 to store the DC power. Although not shown, this battery B is connected to an inverter circuit (running inverter circuit) for driving a running motor of the movable body or/and a control device for controlling running of the movable body and supplies driving power to the running inverter circuit or the control device.

Next, operations of the power-supplying device and the wireless power-supplying system configured as described above will be described in detail with reference to FIGS. 2A to 4.

This wireless power-supplying system starts the supply of electric power for the movable body when the movable body enters a stop space. For example, the communication unit 5 in the power-supplying device S continuously transmits a communication request signal in a constant period. Meanwhile, because the reception of the above-described communication request signal is possible when the movable body enters the stop space, the communication unit 14 in the power-receiving device R transmits an answer signal for this communication request signal to the communication unit 5. Therefore, when this answer signal is received, the communication unit 5 notifies the switching control unit 7 of the reception of the answer signal. As a result, the switching control unit 7 determines (recognizes) that the movable body has entered an area in which electric power can be supplied.

Therefore, the switching control unit 7 starts the control of the chopper circuit 2 and the inverter circuit 3 based on the output power, the output current, or the output voltage of the chopper circuit 2. That is, the switching control unit 7 stops voltage step-up by the chopper circuit 2 and operates only the inverter circuit 3, of the chopper circuit 2 and the inverter circuit 3, so that the output power, the output current, or the output voltage of the chopper circuit 2 reaches a specific value. When the output power, the output current, or the output voltage of the chopper circuit 2 has not reached the specific value according to the operation of only the inverter circuit 3, the switching control unit 7 starts voltage step-up of the chopper circuit 2. Specifically, the switching control unit 7 starts the supply of a switching signal in which the high level and the low level are iterated for the transistor 23 of the chopper circuit 2 and starts voltage step-up of the chopper circuit 2. That is, the switching control unit 7 controls the inverter circuit 3 so that the inverter circuit 3 converts the DC power into the AC power, and controls whether the chopper circuit 2 steps up an input voltage or not based on whether the output value of the chopper circuit 2 reaches the specific value.

In addition, the switching control unit 7 can start the control of the chopper circuit 2 and the inverter circuit 3 based on the state information of the power-receiving device R input from the communication unit 5 in place of the output power, the output current, or the output voltage of the chopper circuit 2. That is, the switching control unit 7 stops voltage step-up by the chopper circuit 2 and operates only the inverter circuit 3, of the chopper circuit 2 and the inverter circuit 3, so that the output power, the output current, or the output voltage of the rectification circuit 12 reaches a specific value. When the output power, the output current, or the output voltage of the rectification circuit 12 has not reached the specific value according to the operation of only the inverter circuit 3, the switching control unit 7 starts voltage step-up of the chopper circuit 2. Specifically, the switching control unit 7 starts the supply of a switching signal in which the high level and the low level are iterated for the transistor 23 of the chopper circuit 2 and starts voltage step-up of the chopper circuit 2. That is, the switching control unit 7 controls the inverter circuit 3 so that the inverter circuit 3 converts the DC power into the AC power, and controls whether the chopper circuit 2 steps up an input voltage or not based on whether the output value of the rectification circuit 12 reaches the specific value. Also, the switching control unit 7 may control the chopper circuit 2 and the inverter circuit 3 based on the output power, the output current, or the output voltage of the chopper circuit 2 and the state information of the power-receiving device R input from the communication unit 5.

Here, a method of controlling the inverter circuit 3 will be described using a specific example. For example, the switching control unit 7 adjusts a phase difference of each of the switching signals S1 to S4 respectively output to the transistors 31 to 34 of the inverter circuit 3 so that the output power, the output current, or the output voltage of the chopper circuit 2 or the rectification circuit 12 reaches the specific value. Specifically, the switching control unit 7 adjusts a phase difference $\phi$ between the switching signals S1 and S3. A phase difference between the switching signals S1 and S2 and a phase difference between the switching signals S3 and S4 are fixed to 180 degrees. An example in which a waveform of FIG. 2B has a smaller phase difference $\phi$ than the waveform of FIG. 2D is shown. In this case, the phase difference $\phi$ between the switching signals S1 and S3 is less than 180 degrees, so that a period in which the high levels of the switching signals S1 and S3 overlap and a period in which the high levels of the switching signals S2 and S4 overlap are generated. A period in which both of the switching signals S1 and S3 have the high level is in a state in which the transistors 31 and 33 of FIG. 2A are turned on and a potential difference between two output nodes of the inverter circuit 3 becomes 0 V. Therefore, no current flows in this period. The period in which the switching signals S2 and S4 have the high level is also similar thereto. Therefore, as the phase difference $\phi$ is less than 180 degrees, a value of an average current flowing through the inverter circuit 3 on the time axis is reduced. Because the inverter circuit 3 and the chopper circuit 2 are connected in series, a current output by the chopper circuit 2 is also reduced when a value of an average current flowing through the above-described inverter circuit 3 decreases. Thus, the output power of the chopper circuit 2 decreases. FIG. 2C shows this state. That is, the switching control unit 7 adjusts the phase difference of each of the switching signals S1 to S4, more specifically, adjusts the phase difference $\phi$ between the switching signals S1 and S3 (at this time, both the phase difference $\phi$ between the switching signals S1 and S2 and the phase difference $\phi$ between the switching signals S3 and S4 are 180 degrees), thereby controlling the output power of the chopper circuit 2. Therefore, the switching control unit 7 can perform control so that the output power, the output current, or the output voltage of the chopper circuit 2 reaches a specific value. In addition, when the output power, the output current, or the output voltage of the chopper circuit 2 does not reach the specific value even when the phase difference $\phi$ becomes 180 degrees according to the control of the inverter circuit as described above, the switching control unit 7 has only to start the supply of the switching signal for the transistor 23 of the chopper circuit 2 and step up the output voltage of the chopper circuit 2. Thereby, because the current increases and the power also increases, the output power, the output voltage, or the output current of the chopper circuit 2 can reach the specific value.

Also, although an example in which the output power, the output current, or the output voltage of the chopper circuit 2 is controlled by adjusting the phase difference φ of each of the switching signals S1 to S4 for the inverter circuit 3 has been described above, the same principle is applied to a situation where the switching control unit 7 controls the output power, the output voltage, or the output current of the rectification circuit 12 via the state information received from the communication unit 5. That is, when the output current of the inverter circuit 3 decreases according to control of the inverter circuit 3 as in the above-described example, electric power received by the resonance circuit 11 consequently decreases and electric power output by the rectification circuit 12 serially connected to the resonance circuit 11 decreases. That is, the switching control unit 7 adjusts the phase difference φ of each of the switching signals S1 to S4, more specifically, adjusts the phase difference φ between the switching signals S1 and S3 (at this time, both the phase difference φ between the switching signals S1 and S2 and the phase difference φ between the switching signals S3 and S4 are 180 degrees), thereby controlling the output power of the rectification circuit 12. Therefore, the switching control unit 7 can perform control so that the output power, the output current, or the output voltage of the rectification circuit 12 reaches a specific value. In addition, when the output power, the output current, or the output voltage of the rectification circuit 12 does not reach the specific value even when the phase difference φ becomes 180 degrees according to the control of the inverter circuit 3 as described above, the switching control unit 7 has only to start the supply of the switching signal for the transistor 23 of the chopper circuit 2 and step up the output voltage of the chopper circuit 2. Thereby, because the current output from the power-supplying device increases and the power also increases, the output power, the output voltage, or the output current of the rectification circuit 12 can reach the specific value.

When the switching control unit 7 has changed the phase difference φ between the switching signals S1 and S3 from 0 degrees to 180 degrees, the output voltage of the inverter circuit 3 increases in proportion to the phase difference φ and the output power, and the output current of the chopper circuit 2 or the inverter circuit 3 increase as shown in FIG. 2C.

Here, the switching control unit 7 not rapidly but gradually changes the phase difference φ between the switching signals S1 and S3 from 0 degrees to 180 degrees. As a result, because the output voltage of the inverter circuit 3 gradually increases, it is possible to prevent a rush current from rapidly flowing through the power-supplying capacitor (resonance capacitor) provided in the resonance circuit 4.

When the output power, the output voltage, or the output current of the chopper circuit 2 or the rectification circuit 12 has reached the specific value, the switching control unit 7 fixes the phase difference φ. On the other hand, when the output power, the output voltage, or the output current of the chopper circuit 2 or the rectification circuit 12 has not reached the specific value in spite of a change of the phase difference φ to 180 degrees, the switching control unit 7 starts the supply of the switching signal to the transistor 23 of the chopper circuit 2 and causes the chopper circuit 2 to start a voltage step-up operation. As a result, the output power, the output voltage, or the output current of the chopper circuit 2 or the rectification circuit 12 can further increase to reach a desired specific value.

Second Embodiment

In addition to the method of adjusting the switching signal S1 for the above-described inverter circuit 3 and the phase difference φ of the switching signal S1, there is a method of controlling the inverter circuit 3 as described below. In the second embodiment, the switching control unit 7 adjusts a duty ratio of each of the switching signals S1 to S4. In other words, the switching control unit 7 adjusts the duty ratio of ON/OFF of the inverter circuit 3. Referring to FIG. 2D, the phase difference φ is 180 degrees and the duty ratio of each of the switching signals S1 to S4 is 50% in FIG. 2D. Here, the duty ratio means a ratio of a high-level period to a signal cycle. The switching control unit 7 adjusts the duty ratio of each of the switching signals S1 to S4 in a range of 0% to 50% based on the output power, the output voltage, or the output current of the chopper circuit 2 received from the power measurement unit 6. When the duty ratios of the switching signals S1 to S4 are closer to 0%, the high-level periods of the switching signals S1 to S4 are shorter. As a result, on the timing chart of signal waveforms, low-level periods occur in all the switching signals S1 to S4. The period becomes longer when the duty ratio is closer to 0%. Because a period in which a current flows through the inverter circuit 3 is shorter when the duty ratio is closer to 0%, a value of an average current on the time axis decreases. Because the inverter circuit 3 and the chopper circuit 2 are connected in series, a current output by the chopper circuit 2 also decreases when a value of an average current flowing through the above-described inverter circuit 3 decreases. Thus, an output power of the chopper circuit 2 decreases. That is, the switching control unit 7 adjusts the duty ratio of each of the switching signals S1 to S4, thereby controlling the output power of the chopper circuit 2. Therefore, according to the control method of the second embodiment, the switching control unit 7 can also perform control so that the output power, the output voltage, or the output current of the chopper circuit 2 reaches the specific value. Also, the switching control unit 7 can adjust the duty ratio of each of the switching signals S1 to S4 in a range of 0% to 50% based on the output power, the output current, or the output voltage of the rectification circuit 12 included in the state information received from the power measurement unit 13. In addition, when the output power, the output current, or the output voltage of the chopper circuit 2 does not reach the specific value even when the duty ratio reaches 50% according to a method of controlling the inverter circuit 3 as described above, the switching control unit 7 has only to start the supply of the switching signal to the transistor 23 of the chopper circuit 2 and step up the output voltage of the chopper circuit 2. Thereby, because the current output from the power-supplying device increases and the electric power also increases, the output power, the output current, or the output voltage of the rectification circuit 12 can reach the specific value.

Also, although an example in which the output power, the output current, or the output voltage of the chopper circuit 2 is controlled by adjusting the duty ratio of each of the switching signals S1 to S4 for the inverter circuit 3 has been described above, the same principle is applied to a situation where the switching control unit 7 controls the output power, the output voltage, or the output current of the rectification circuit 12 via the state information received from the communication unit 5. That is, when the output current of the inverter circuit 3 decreases according to the method of controlling the inverter circuit 3 as in the above-described example, electric power received by the resonance circuit 11 consequently decreases and electric power output by the rectification circuit 12 serially connected to the resonance circuit 11 decreases. That is, the switching control unit 7 adjusts the duty ratio of each of the switching signals S1 to S4, thereby controlling the output power of the rectification circuit 12. Therefore, the switching control unit 7 can perform control so that the output power, the output current, or the output voltage of the rectification circuit 12 reaches a specific value. In addition, when the output power, the output current, or the output voltage of the rectification circuit 12 does not reach the specific value even when the duty ratio reaches 50% according to the method of controlling the inverter circuit 3 as described above, the switching control unit 7 has only to start the supply of the switching signal for the transistor 23 of the chopper circuit 2 and step up the output voltage of the chopper circuit 2. Thereby, because the current output from the power-supplying device increases and the power also increases, the output power, the output voltage, or the output current of the rectification circuit 12 can reach the specific value.

Also, as an example of a specific control method, the switching control unit 7 changes the duty ratio of each of the switching signals S1 to S4 from 0% to 50% so that the output power, the output current, or the output voltage of the chopper circuit 2 or the rectification circuit 12 reaches a specific value.

Here, the switching control unit 7 also not rapidly but gradually changes the duty ratio of each of the switching signals S1 to S4. As a result, because the output voltage of the inverter circuit 3 gradually increases, it is possible to prevent a rush current from rapidly flowing through the power-supplying capacitor (resonance capacitor) provided in the resonance circuit 4.

When the output power, the output voltage, or the output current of the chopper circuit 2 or the rectification circuit 12 has reached the specific value, the switching control unit 7 fixes the duty ratio of each of the switching signals S1 to S4. On the other hand, when the output power, the output voltage, or the output current of the chopper circuit 2 or the rectification circuit 12 has not reached the specific value in spite of a change of the duty ratio of each of the switching signals S1 to S4 to 50%, the switching control unit 7 starts the supply of the switching signal to the transistor 23 included in the chopper circuit 2 and causes the chopper circuit 2 to start a voltage step-up operation. As a result, the output power, the output voltage, or the output current of the chopper circuit 2 or the rectification circuit 12 reaches the specific value.

Figure 3:
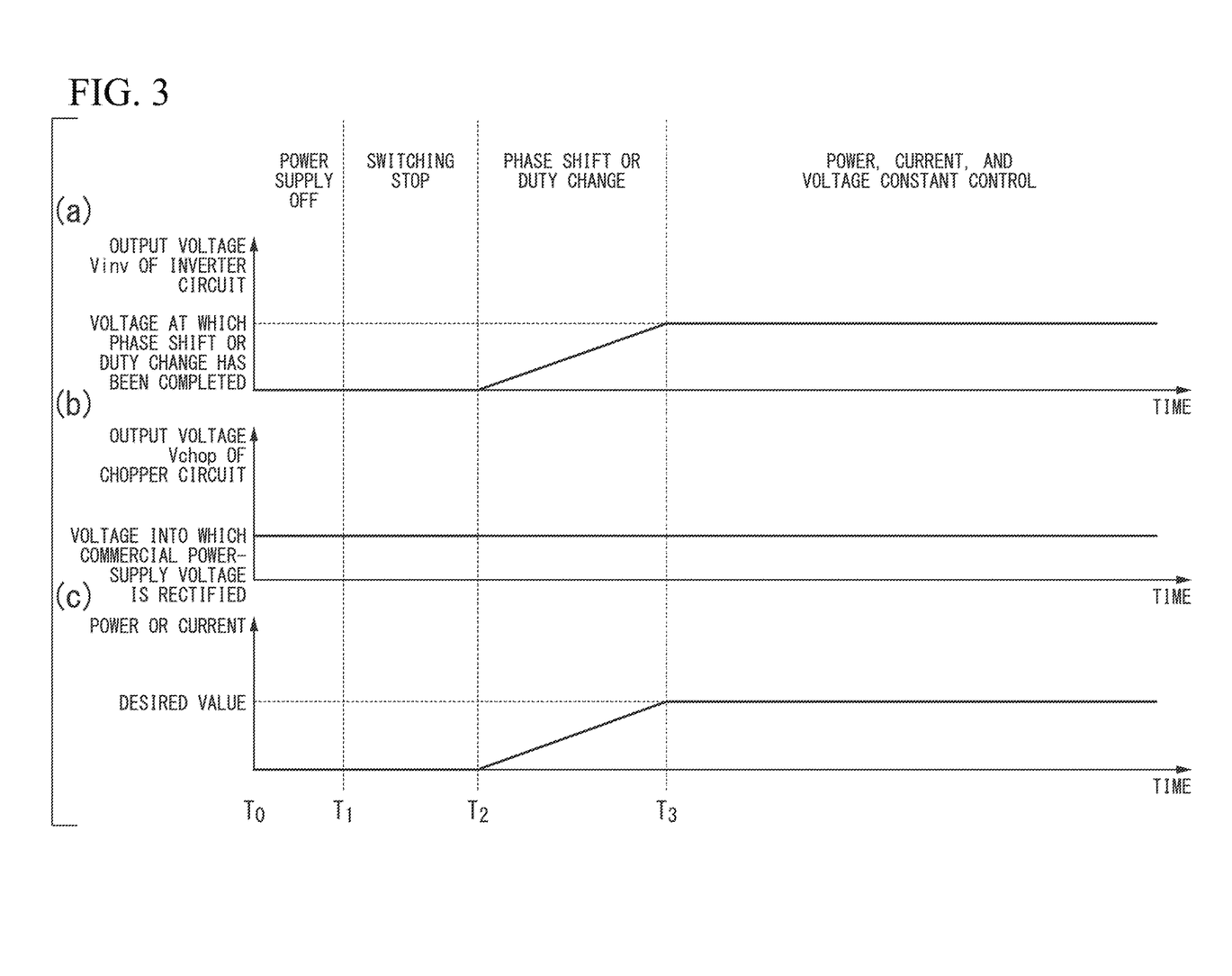
FIG. 3 is a characteristic diagram showing an operation of the wireless power-supplying system according to the second embodiment of the present disclosure.

Graph (a) of FIG. 3 shows the temporal transition of the output voltage of the inverter circuit 3 in a case in which the output power, the output voltage, or the output current of the chopper circuit 2 or the rectification circuit 12 has reached the specific value according to an operation of only the inverter circuit 3. In addition, Graph (b) of FIG. 3 shows the temporal transition of the output voltage of the chopper circuit 2 of the case. Further, Graph (c) of FIG. 3 shows the temporal transition of the output current and the output power of the power-supplying device S of the case.

As shown in Graph (a) of FIG. 3, the output voltage of the inverter circuit 3 becomes 0 V in a period from $T_0$ to $T_1$ (when the supply of electric power from the commercial power source is in an OFF state) and a period from $T_1$ to $T_2$ (when the inverter circuit 3 is in a stop state). Subsequently, in a period from $T_2$ to $T_3$, the switching control unit 7 starts to adjust the phase difference φ between the switching signals S1 and S3 or the duty ratio of each of the switching signals S1 to S4. Then, as shown in Graph (a) of FIG. 3, the output voltage of the inverter circuit 3 gradually increases.

Because the switching control unit 7 fixes the phase difference φ or the duty ratio when the output power, the output voltage, or the output current of the chopper circuit 2 or the rectification circuit 12 has reached the specific value according to an operation of only the inverter circuit 3, the output voltage of the inverter circuit 3 is stable, as shown in a period subsequent to Time $T_3$ of Graph (a) of FIG. 3. At this time, because the chopper circuit 2 does not operate and step up a voltage, the output voltage from the chopper circuit 2 does not change, as shown in Graph (b) of FIG. 3. In addition, as shown in Graph (c) of FIG. 3, the output current and the output voltage of the power-supplying device S changes in synchronization with the temporal transition of the output voltage of the inverter circuit 3 shown in Graph (a) of FIG. 3.

Figure 4:
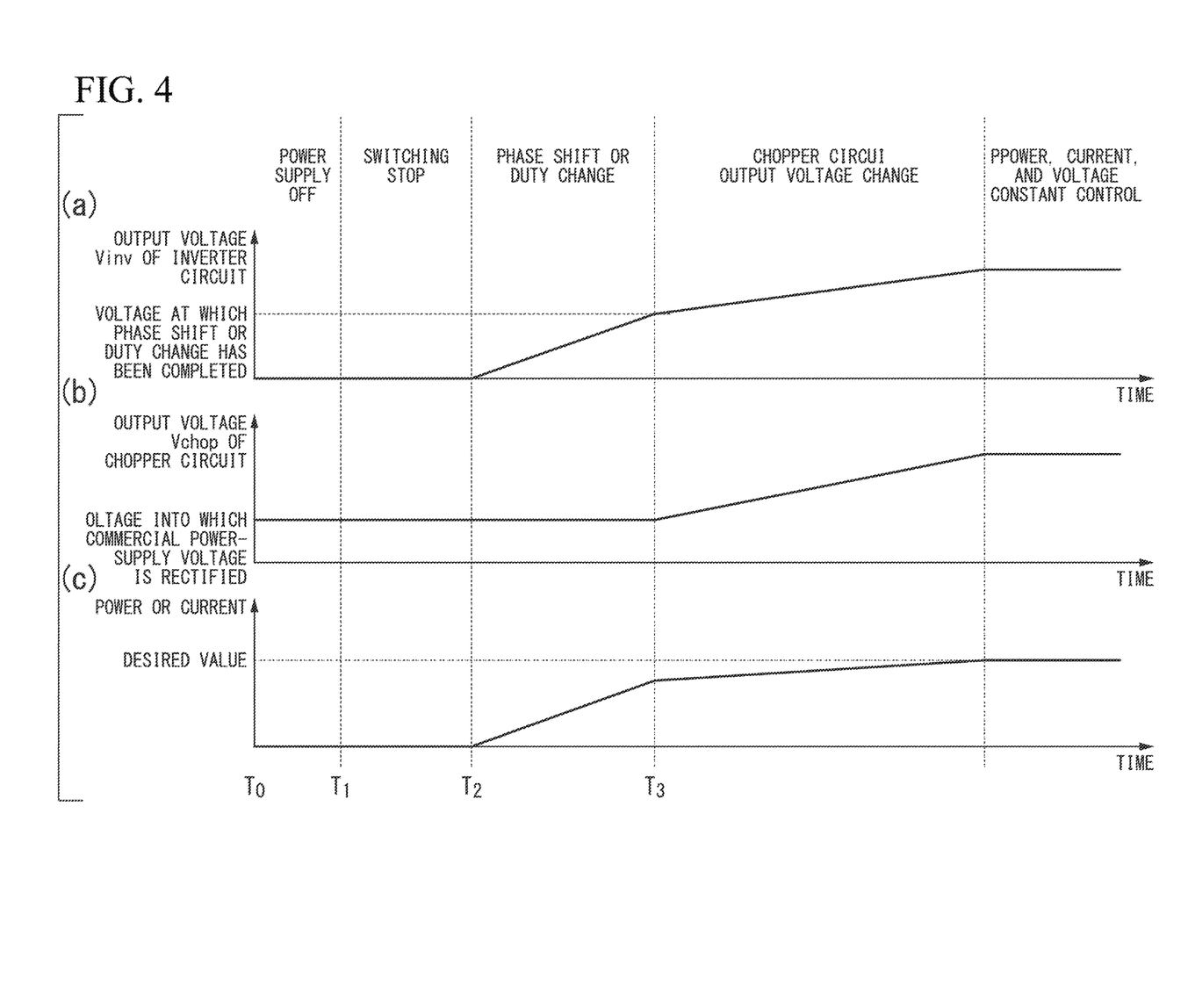
FIG. 4 is a characteristic diagram showing an operation of the wireless power-supplying system according to the second embodiment of the present disclosure.

On the other hand, Graph (a) of FIG. 4 shows the temporal transition of the output voltage of the inverter circuit 3 in a case in which the output power, the output voltage, or the output current of the chopper circuit 2 or the rectification circuit 12 has reached the specific value according to operations of both the inverter circuit 3 and the chopper circuit 2. In addition, Graph (b) of FIG. 4 shows the temporal transition of the output voltage of the chopper circuit 2 of the case. Further, Graph (c) of FIG. 4 shows the temporal transition of the output current and the output power of the power-supplying device S of the case.

As shown in Graph (a) of FIG. 4, the output voltage of the inverter circuit 3 becomes 0 V in a period from $T_0$ to $T_1$ (when the supply of electric power from the commercial power source is in an OFF state) and a period from $T_1$ to $T_2$ (when the inverter circuit 3 is in a stop state). Subsequently, in a period from $T_2$ to $T_3$, the switching control unit 7 starts to adjust the phase difference φ between the switching signals S1 and S3 or the duty ratio of each of the switching signals S1 to S4. Then, as shown in Graph (a) of FIG. 4, the output voltage of the inverter circuit 3 gradually increases.

However, because the output power, the output voltage, or the output current of the chopper circuit 2 or the rectification circuit 12 does not reach the specific value according to an operation of only the inverter circuit 3 here, the switching control unit 7 starts a voltage step-up operation of the chopper circuit 2. As a result, as shown in Graph (a) of FIG. 4, even in the period subsequent to Time $T_3$, the output voltage of the inverter circuit 3 continuously increases and the output voltage of the inverter circuit 3 reaches a target value. At this time, because the chopper circuit 2 starts an operation in the period subsequent to Time $T_3$, the output voltage of the chopper circuit 2 gradually increases in the period subsequent to Time $T_3$ as shown in Graph (b) of FIG. 4. In addition, as shown in Graph (c) of FIG. 4, the output current and the output power of the power-supplying device S change in synchronization with the temporal transition of the output voltage of the inverter circuit 3 shown in Graph (a) of FIG. 4.

Third Embodiment

In the third embodiment, the switching control unit 7 adjusts a frequency (switching frequency) of each of switching signals S1 to S4. Here, impedance Zinv1 from an input of the inverter circuit 3 to an output of the resonance circuit 4 or impedance Zinv2 from an output of the inverter circuit 3 to the output of the resonance circuit 4 has a frequency characteristic in which its absolute value or phase changes depending upon the frequency. When the switching control unit 7 changes frequencies of the switching signals S1 to S4, switching frequencies of the transistors 31 to 34 change, and the impedance Zinv1 or Zinv2 also changes. As a result, a value of a current flowing through a system including the chopper circuit 2, the inverter circuit 3, and the resonance circuit 4 connected in series changes. Therefore, when a value of the current decreases as a result of adjusting the frequency of the switching signal, the output power, the output voltage, or the output current of the chopper circuit 2 decreases. This enables the output power of the chopper circuit 2 to be controlled when the switching control unit 7 adjusts the frequency of each of the switching signals S1 to S4. Also, whether to increase or decrease the frequencies of the switching signals S1 to S4 is determined by a circuit configuration of the chopper circuit 2, the inverter circuit 3, and the resonance circuit 4. This is because the above-described impedance frequency characteristic differs according to the circuit configuration. In addition, although an example in which the frequencies of the switching signals S1 to S4 are adjusted so that the output power, the output current, or the output voltage of the chopper circuit 2 reaches a specific value has been described above, the switching control unit 7 can also adjust the frequencies of the switching signals S1 to S4 so that the output power, the output current, or the output voltage of the rectification circuit 12 reaches the specific value as described above. Because this has been described above, redundant description thereof will be omitted. In addition, as an example of a specific control method, the switching control unit 7 changes the frequency (switching frequency) of each of the switching signals S1 to S4 from a high frequency to a low frequency. Here, also, the switching control unit 7 not rapidly but gradually changes the switching frequency of the inverter circuit 3. As a result, because the impedance gradually increases, it is possible to prevent a rush current from rapidly flowing through the power-supplying capacitor (resonance capacitor) provided in the resonance circuit 4.

When the output power, the output voltage, or the output current of the chopper circuit 2 or the rectification circuit 12 has reached the specific value, the switching control unit 7 operates only the inverter circuit 3. On the other hand, when the output power, the output voltage, or the output current of the chopper circuit 2 or the rectification circuit 12 has not reached the specific value according to the operation of only the inverter circuit 3, the switching control unit 7 causes the chopper circuit 2 to start a voltage step-up operation. As a result, the output power, the output voltage, or the output current of the chopper circuit 2 or the rectification circuit 12 reaches a specific value.

According to this embodiment, only the inverter circuit 3, of the chopper circuit 2 and the inverter circuit 3, is operated so that the output power, the output current, or the output voltage of the chopper circuit 2 or the rectification circuit 12 reaches a specific value, and the chopper circuit 2 is operated along with the inverter circuit 3 when the output power, the output current, or the output voltage of the chopper circuit 2 or the rectification circuit 12 has not reached the specific value according to the operation of only the inverter circuit 3. That is, the case in which only the inverter circuit 3 is used and the case in which both the inverter circuit 3 and the chopper circuit 2 are used are provided. Because of this, it is possible to realize a wide power range in the supply of electric power.

According to the above-described first to third embodiments, it is possible to prevent a rush current from rapidly flowing through the power-supplying capacitor (resonance capacitor) provided in the resonance circuit 4 by not rapidly but gradually changing a phase difference ϕ, a duty ratio, or a switching frequency.

Also, the present disclosure is not limited to the above-described first to third embodiments. For example, the following variant examples are possible.

(1) The power factor correction function of the rectification circuit 1 is provided in the chopper circuit 2 in the above-described first to third embodiments, but the present disclosure is not limited thereto and the power factor correction function may be omitted.

(2) The wireless power-supplying system based on a magnetic-field resonance scheme has been described in the above-described first to third embodiments, but the present disclosure is not limited thereto and may be a wireless power-supplying system based on an electromagnetic induction scheme. When electric power is transmitted through the electromagnetic induction scheme, it is possible to omit the resonance circuit. In addition, the load is the battery B in the above-described first to third embodiments, but the load is not limited to the battery B in the present disclosure. Instead of the battery B, various storage devices or various types of devices for receiving the supply of electric power to perform a predetermined function may be provided.

(3) The power-supplying device S has the chopper circuit 2 which is a voltage step-up chopper circuit in the above-described first to third embodiments, but the present disclosure is not limited to the voltage step-up chopper circuit. Instead of the voltage step-up chopper circuit, a voltage step-up/down chopper circuit may be provided.

(4) The case in which the voltage converter is a chopper circuit has been described in the above-described first to third embodiments, but the voltage converter is not limited to a non-insulation type DC-DC converter using the chopper circuit. For example, it is possible to implement a voltage converter by an insulation type DC-DC converter using a transformer or the like.

(5) Specific numerical values such as 0 degrees, 180 degrees, 0%, and 50% have been described in relation to the phase difference, the duty ratio, etc. in the above-described first to third embodiments, but the present disclosure is not limited to the case in which the phase difference, the duty ratio, etc. are strictly equal to the specific numerical values. For example, as long as an error range is predetermined based on a measurement error or a control error and the phase difference, the duty ratio, or the like is included in its range, the phase difference, the duty ratio, or the like can be considered to be a desired specific value.

INDUSTRIAL APPLICABILITY

According to the present disclosure, a switching control unit controls an inverter circuit so that the inverter circuit converts DC power into AC power and controls whether a chopper circuit steps up an input voltage or not based on whether an output value of the chopper circuit or an output value of a rectification circuit reaches a specific value. Because this control allows switching electric power supplied by only the inverter circuit and electric power supplied by both the inverter circuit and the chopper circuit, it is possible to implement the supply of electric power in a wider power range than in the conventional technology.

DESCRIPTION OF REFERENCE SIGNS

1 Rectification circuit
2 Chopper circuit (voltage converter)
3 Inverter circuit
4 Resonance circuit
5 Communication unit
6 Power measurement unit
7 Switching control unit
11 Resonance circuit
12 Rectification circuit
12 Power measurement unit
14 Communication unit
15 Control unit
B Battery
R Power-receiving device
S Power-supplying device
21 Coil
22 Diode
23 Transistor (switching element)
24 Capacitor
31 to 34 Transistor (switching element)
35 to 38 Diode (feedback diode)
S1 to S4 Switching signal

The invention claimed is:

1. A power-supplying device for wirelessly transmitting alternating current (AC) power to a power-receiving device, the power-supplying device comprising:
a voltage converter;
an inverter circuit connected to the voltage converter;
a communication unit configured to receive an output value of a rectification circuit provided in the power-receiving device from the power-receiving device;
a switching control unit configured to control the inverter circuit so that the inverter circuit converts direct current (DC) power into AC power and control whether the voltage converter steps up an input voltage or not based on whether an output value of the voltage converter or an output value of the rectification circuit reaches a specific value,
wherein the switching control unit is configured to control only the inverter circuit when the output value of the voltage converter or the output value of the rectification circuit reaches the specific value according to the control of only the inverter circuit, and
wherein, when the output value of the voltage converter or the output value of the rectification circuit has not reached the specific value according to the control of only the inverter circuit, the switching control unit is configured to control the voltage converter such that the voltage converter steps up the input voltage.

2. The power-supplying device according to claim 1, wherein the switching control unit outputs switching signals for switching an ON state and an OFF state of each of switching elements included in the inverter circuit and adjusts a phase difference of each of the switching signals.

3. The power-supplying device according to claim 1, wherein the switching control unit outputs switching signals for switching an ON state and an OFF state of each of switching elements included in the inverter circuit and adjusts a duty ratio of each of the switching signals.

4. The power-supplying device according to claim 1, wherein the switching control unit outputs switching signals for switching an ON state and an OFF state of each of switching elements included in the inverter circuit and adjusts a frequency of each of the switching signals.

5. The power-supplying device according to claim 1,
wherein the output value of the voltage converter is a value of power, a voltage, or a current output by the voltage converter, and
wherein the output value of the rectification circuit is a value of power, a voltage, or a current output by the rectification circuit.

6. A wireless power-supplying system comprising:
a power-supplying device configured to wirelessly transmit AC power to a power-receiving device, the power-supplying device including
a voltage converter;
an inverter circuit connected to the voltage converter; and
a first communication unit, and
the power-receiving device including
a rectification circuit;
a control unit configured to output an output value of the rectification circuit; and
a second communication unit connected to the control unit and configured to transmit the output value to the first communication unit,
wherein the power-supplying device includes a switching control unit configured to control the inverter circuit so that the inverter circuit converts DC power into AC power and control whether the voltage converter steps up an input voltage or not based on whether an output value of the voltage converter or an output value of the rectification circuit reaches a specific value,
wherein the switching control unit is configured to control only the inverter circuit when the output value of the voltage converter or the output value of the rectification circuit reaches the specific value according to the control of only the inverter circuit, and
wherein, when the output value of the voltage converter or the output value of the rectification circuit has not reached the specific value according to the control of only the inverter circuit, the switching control unit is configured to control the voltage converter such that the voltage converter steps up the input voltage.

7. The wireless power-supplying system according to claim 6, wherein the switching control unit outputs switching signals for switching an ON state and an OFF state of each of switching elements included in the inverter circuit and adjusts a phase difference of each of the switching signals.

8. The wireless power-supplying system according to claim 6, wherein the switching control unit outputs switching signals for switching an ON state and an OFF state of each of switching elements included in the inverter circuit and adjusts a duty ratio of each of the switching signals.

9. The wireless power-supplying system according to claim 6, wherein the switching control unit outputs switching signals for switching an ON state and an OFF state of each of switching elements included in the inverter circuit and adjusts a frequency of each of the switching signals.

10. The wireless power-supplying system according to claim 6,
wherein the output value of the voltage converter is a value of power, a voltage, or a current output by the voltage converter, and
wherein the output value of the rectification circuit is a value of power, a voltage, or a current output by the rectification circuit.

* * * * *